United States Patent [19]

Tran et al.

[11] Patent Number: 4,951,171

[45] Date of Patent: Aug. 21, 1990

[54] POWER SUPPLY MONITORING CIRCUITRY FOR COMPUTER SYSTEM

[75] Inventors: Thanh T. Tran, Tomball; Richard E. Walker, Spring; Richard A. Faulk, Cypress, all of Tex.

[73] Assignee: Compaq Computer Inc., Houston, Tex.

[21] Appl. No.: 350,595

[22] Filed: May 11, 1989

[51] Int. Cl.⁵ ............................................. H02H 3/24
[52] U.S. Cl. ......................................... 361/90; 361/91; 361/92; 361/93; 390/663; 390/66; 390/664
[58] Field of Search ..................... 361/86, 87, 90, 91, 361/92, 93; 240/660, 661, 662, 663, 664

[56] References Cited

U.S. PATENT DOCUMENTS

| | | | |
|---|---|---|---|
| 4,600,962 | 2/1986 | Bliehall | 361/92 X |
| 4,638,175 | 1/1987 | Bradford et al. | 361/90 X |
| 4,772,980 | 9/1988 | Curtis et al. | 361/90 |

*Primary Examiner*—Derek S. Jennings
*Attorney, Agent, or Firm*—Arnold, White & Durkee

[57] ABSTRACT

A computer system having a power supply monitoring arrangement employs a number of comparators for detecting whether or not various supply voltages produced by the power supply for use in the computer are above or below a reference level, or whether an overcurrent condition exists. These detected conditions are used to determine whether or not the power supply should be shut down, or during power-up to determine whether the initialization routine can be started by the CPU. Delays are included to prevent an undervoltage condition from indicating shut down of the power supply during power-up.

20 Claims, 3 Drawing Sheets

POWER SUPPLY MONITORING CIRCUITRY FOR COMPUTER SYSTEM

BACKGROUND OF THE INVENTION

The present invention relates to digital computer systems, and more particularly to circuitry for monitoring power supply voltages for a computer system or the like.

Electronic equipment such as a desktop computer has a power supply which receives line current at 110 or 220 V. AC and produces a number of DC supply voltages for powering the integrated circuits, disk drives, and the like. In order to prevent damage or improper operation of the equipment when there is a fault in the power supply, monitor circuits have been used to detect these various voltages and to shut down the equipment when critical supply voltages are outside acceptable ranges of operation. For example, undervoltage and/or overvoltage detectors are used to monitor the +5 V and +12 V supply voltages, as well as negative supply voltages, commonly used to power the microprocessor and memory chips in a desktop computer, and to shut off the operation of the computer when the voltages are out of range. Upon power-up, erratic operation would occur if the initialization routine were started by the CPU before the supply voltages to the chips reached the specified values, and errors could result.

Power supply monitor or supervisor circuits have been previously available for computer systems or the like in which supply voltages are monitored and fault conditions are used to shut down the power supply, and the reset function of the CPU inhibited to prevent premature beginning of the initialization at power-up. However, these prior devices were not able to distinguish anomalous conditions during power-up and power-down in order to prevent erratic operation.

It is a principal object of the invention to provide an improved power supply monitor for a computer or the like, particularly a monitor which provides improved performance during power-up sequences. Another object is to provide an improved method for operating a computer or the like during power-up, particularly by monitoring the power supply voltages to prevent the computer from beginning its initialization routines until the supply voltages are at proper levels, but yet responding to overvoltage or overcurrent to shut off the power supply if faults occur.

SUMMARY OF THE INVENTION

In accordance with one embodiment of the invention, a monitor or supervisor circuit is responsive to various conditions relating to the power supply output in a computer system or similar equipment. This monitor circuit produces a number of different control or indicator voltages having different characteristics, to be used by the CPU of the computer and/or by the power supply. In particular, a power-good signal is produced to indicate to the CPU that the initialization routine may be started upon power-up, or the CPU may be reset. An undervoltage detector arrangement monitors the various suply voltages to see if they are below the necessary levels, and if so this power-good signal is negated. In addition, a shutdown signal is produced to be applied to the power supply if certain overvoltage and/or overcurrent conditions occur, as well as the undervoltage condition. Delay circuits are included so that during power-up the undervoltage condition (which would always occur until the voltages built up at the power supply outputs) will not produce the shutdown signal.

BRIEF DESCRIPTION OF THE DRAWINGS

The novel features characteristic of the invention are set forth in the appended claims. The invention itself, however, as well as other features and advantages thereof, will be best understood by reference to a detailed description of a specific embodiment, when read in conjunction with the accompanying drawings, wherein:

DETAILED DESCRIPTION OF SPECIFIC EMBODIMENT

Figure 1:
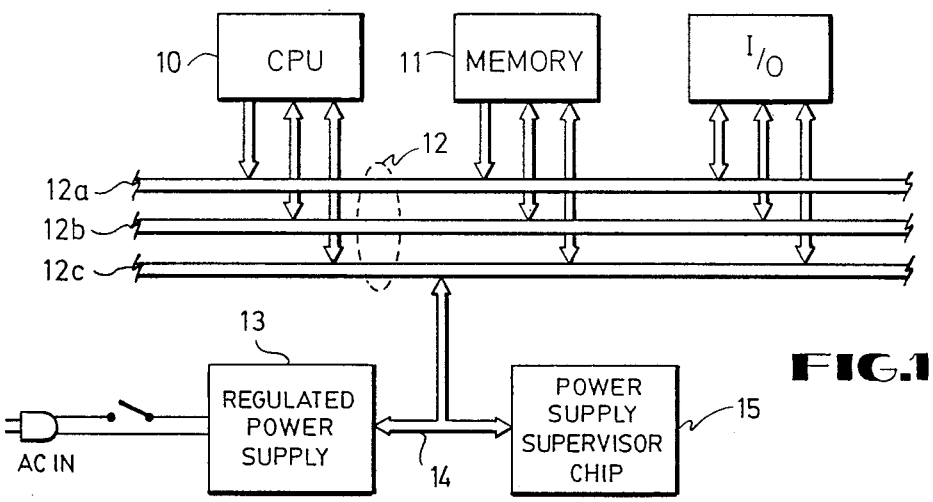
FIG. 1 is an electrical diagram in block form of a computer system including a power supply monitor which uses features of the invention.

Referring to FIG. 1, a computer system of the type used for desktop personal computers is illustrated, employing a power supply monitor according to one embodiment of the invention. The computer system includes a CPU 10 which typically would be an Intel 80386 microprocessor chip, or a similar device. The microprocessor or CPU 10 accesses a memory 11 which ordinarily includes banks of DRAMs as well as ROMs and/or EPROMs. A system bus 12 interconnects the system components such as the CPU 10 and memory 11, and this bus includes an address bus 12a, a data bus 12b and a control and power supply bus 12c. A power supply 13 generates a number of DC supply voltages such as +5 V, +12 V, etc., as will be described, from an AC line connection. According to the invention, these supply voltages are monitored by a power supply supervisor circuit 15 coupled to a multiple-line bus 14 connecting the output of the power supply 13 to the power conductors of the bus 12c. The circuit 15 generates certain control voltages as will be described, particularly a "power-good" signal which is connected to the CPU 10 to provide an indication of when the CPU can begin its initialization routine or "reset", and a "shutdown" signal which is connected to the power supply 13 via bus 14 to disable the power supply when a fault occurs as detected by the circuit 15.

Figure 2:
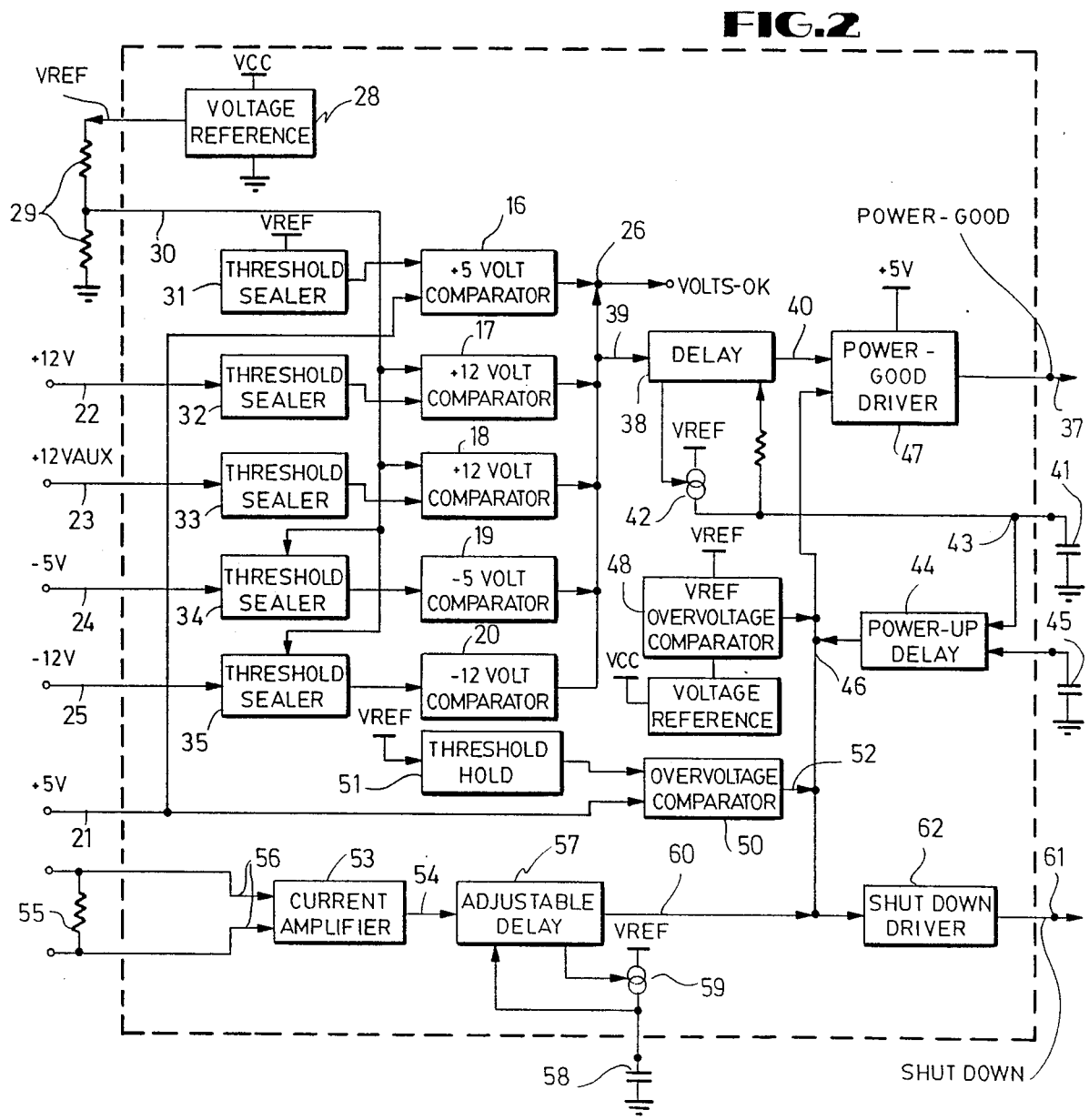
FIG. 2 is an electrical diagram in block form of the power supply monitor circuitry of the system of FIG. 1.

Referring to FIG. 2, the power supply supervisor circuit 15 according to the invention is illustrated in more detail. This circuit includes five comparators 16, 17, 18, 19 and 20 which are responsive to low voltage for the five power supply output voltages +5 V, +12 V (Main), +12 V (Aux), −5 V, and −12 V present on inputs 21, 22, 23 24 and 25, respectively. The outputs of all five of the comparators 16-20 are wire-ORed at a node 26 to produce a "volts-OK" output when the voltages have all reached their respective nominal levels. The circuit 15 of FIG. 2 operates off of a $V_{cc}$ supply voltage received from the power supply 13 independently of the voltages on lines 21-25, so this circuitry 15 goes into operation upon power-up even if the supply voltages on lines 21-25 are not yet available. A voltage reference $V_{ref}$ is generated from $V_{cc}$ within the circuitry 15 by a reference voltage generator 28, using a precision bandgap reference diode or the like; this voltage reference $V_{ref}$ is, for example, +5.075 V±0.050. The $V_{ref}$ voltage is used by the comparator 16 and for other functions as will be described. During power-up, the $V_{ref}$ voltage goes high as $V_{cc}$ goes high, independent of the supply voltages on lines 21–25. The $V_{ref}$ voltage from the generator 28 is applied to an external voltage divider 29 to produce an "undervoltage set point" on line 30 of some selected fraction of +5 V. The values of these resistors which form the voltage divider 29 can be selected by the user since these resistors are external to the integrated circuit; the set point can thus be defined for the particular use. This undervoltage set point on line 30 is used to set the trip points of four of the undervoltage comparators 17–20. To this end, the set point voltage is applied as an input to the +12 V comparators 17 and 18. Each one of the comparators 16–20 has a threshold scaler 31, 32, 33, 34, or 35, associated with it; these threshold scalers are voltage dividers or the like, and function to establish a selected ratio of the inputs 21–25 to be applied to the comparators 16–20 to define the trip points of the comparators. The $V_{ref}$ voltage from voltage reference generator 28 is applied to the threshold scaler 31, and the undervoltage set point on line 30 is applied to the threshold scalers 34 and 35 for the negative voltages −5 V and −12 V.

The five comparators 16–20 monitor the five supply voltages for undervoltage, and produce the "volts-OK" output 26 if none of the inputs is at an undervoltage condition. If any one of the input voltages 21–25 has an undervoltage condition, the "volts-OK" signal on node 26 will go low, indicating a fault condition; if all of the undervoltage comparators 16–20 detect normal voltage conditions, the output node 26 is high (exhibits high impedance, i.e., the output is an "open collector" arrangement). The comparators 16–20 monitor the supply voltages on lines 21–25 and each one will change its output to node 26 as the input voltage traverses its respective trip voltage level. The output node 26 indicates the composite status of all of the five undervoltage comparators 16–20. This "volts-OK" signal on node 26 stays low on power-up until all of the monitored voltage levels are above their respective trip levels. When power is first applied to the circuitry 15, it is expected that an undervoltage condition will be present and this volts-OK signal will be low, then when all of the monitored voltage levels on inputs 21–25 reach their nominal values the volts-OK signal will go high.

The circuitry 15 of FIG. 2 produces a "power-good" signal on an output 37, and one input to produce this signal is generated from a delay circuit 38 receiving the "volts-OK" signal from node 26 as an input 39. The power-good signal is produced only when the +5 V voltage on line 21 is high, and the output 40 of the delay circuit 38 is high. A capacitor 41 establishes the RC time constant for the delay circuit 38, along with a current supply 42. So, at the end of a time interval following the time the volts-OK signal goes high, the power-good signal will go high, indicating normal operating conditions. A node 43 charged by the current supply 42 is one input to a power-up delay circuit 44, and another capacitor 45 is the other; the capacitor 45 is charged from $V_{cc}$ and generates a voltage level a selected time after $V_{cc}$ goes high, then node 43 produces a selected level after the volts-OK level on node 26 has gone high; when both have come up, the power-up delay circuit 44 produces an output on a node 46 used as one of the differential inputs to the driver 47 for the power-good output 37.

During normal operation, the volts-OK signal stays in the high state, then if an undervoltage fault occurs this signal goes low and a time interval is initiated (determined by the value of the capacitor 41) after which the output of the delay 38 changes and the power-good output 37 will produce a fault indication.

Another input to the node 46 is an overvoltage comparator 48, responsive to the $V_{ref}$ voltage level and producing an output when a selected level is exceeded; thus, the power-good signal would be negated if overvoltage is detected for $V_{ref}$. Likewise, an overvoltage detector 50 compares the +5 V voltage on input 21 to a level established by the $V_{ref}$ voltage and a scaler 51 to produce another output 52 to the node 46, again providing a negation of the power-good signal if the +5 V voltage exceeds the proper level.

A current-sense circuit 53 produces an output on line 54 if the current in the main supply line for one of the supply voltages exceeds a selected level. The current sense circuit can be used with either the +5 V or +12 V supplies, but is show connected to sense the +5 V supply in this case since +5 V supply is the main or most-used supply. The current is sensed by a small resistor 55 in series with the +5 V supply, with terminals of the resistor being differential inputs 56 to the differential detector of the circuit 53. To remove the effect of short current spikes, a time delay is interposed by a delay circuit 57 having an RC time constant set by a capacitor 58 charged from a constant current generator 59 supplied $V_{ref}$. The output 60 of the delay circuit 59 is also connected to the node 46 to influence the power-good signal; i.e., an overcurrent condition will negate the power-good signal even if other conditions are at the proper level. So, if an overcurrent condition exists for a period of time longer than the delay interval determined by the value of the capacitor 58, then the power-good signal and the shutdown signal indicate fault conditions. If the duration of the overcurrent condition is less than the delay period, the power-good and shutdown signals remain unchanged. When the overcurrent condition is cleared, the power-good and shutdown signals return to normal, so if the power supply hasn't gone to fault shutdown then the CPU will reset and operation can continue.

Another output of the supervisor circuit 15 is the shutdown signal on a line 61, produced when either of the overvoltage comparators 48 or 50, or the overcurrent detector output 60, exhibits a fault condition, or if the undervoltage indication persists for longer than the selected delay. This shutdown signal is produced on the line 61 immediately if an overvoltage is detected, rather than being held off by the delays of circuits 38 or 44 as is true for the power-good output on line 37. When power is first applied to the circuit 15, the undervoltage condition indicated at node 26 is inhibited from affecting the shutdown signal for a time interval determined by the value of the capacitor 45 which causes the node 46 to be held down until the node 43 reaches a selected level; this time interval is designed to be longer than the delay created by the delay circuit including elements 38, 41 and 42, since the capacitor 41 is selected to be smaller than the capacitor 45.

The shutdown driver circuit 62 produces the shutdown signal on line 61 in response to the condition of the overvoltage comparators 48 and 50, the delayed overcurrent detector 53, and the delayed version of the undervoltage comparators 16–20 (via node 43). During normal voltage and current conditions the output 61 is held high (high impedance), but if any of the inputs indicate a fault condition the shutdown output 61 is driven low. The shutdown signal is high (no-fault condition) during the power-up sequence, regardless of the condition of the volts-OK signal, i.e., regardless of whether an undervoltage is detected, since during power-up it is expected that the supply voltages will be low until they ramp up to the desired level, which takes up to perhaps 100-msec. However, the shutdown signal must respond to the overvoltage detectors 48 and 50 immediately, even during power-up, and respond to the overcurrent condition (after the delay of circuit 59).

An important feature is that during power-up of the power supply 13, the undervoltage comparators 16–20 are inhibited from affecting the shutdown output 61, but then are enabled after a time set by the capacitor 41. Thus, during power-up, the shutdown signal is independent of the undervoltage condition, but responds immediately overvoltage, and responds to overcurrent after a programmed delay time expires. If there are no overvoltage or overcurrent conditions during power-up of the power supply 13, then the shutdown signal will stay high (not sink any current) allowing all of the supply voltages on lines 21–25 to build up to the proper levels. Another feature is that if, for some reason, the $V_{cc}$ power supply faults (goes to zero, or too low), the +5 V input becomes overvoltage; even without $V_{cc}$ the shutdown output 61 is able to shut down the power supply 13 to avoid any damage caused by the overvoltage condition. During power-up of the power supply 13, the power-good output 37 will indicate a fault condition until all of the supply voltages on inputs 21–25 are at the proper levels; during power-down, if the $V_{cc}$ supply applied to the circuit 15 disappears before the +5 V supply does, the power-good signal indicates a fault even without the present of $V_{cc}$, so the CPU 10 will be shut down before an anomalous condition can be entered.

Figure 3:
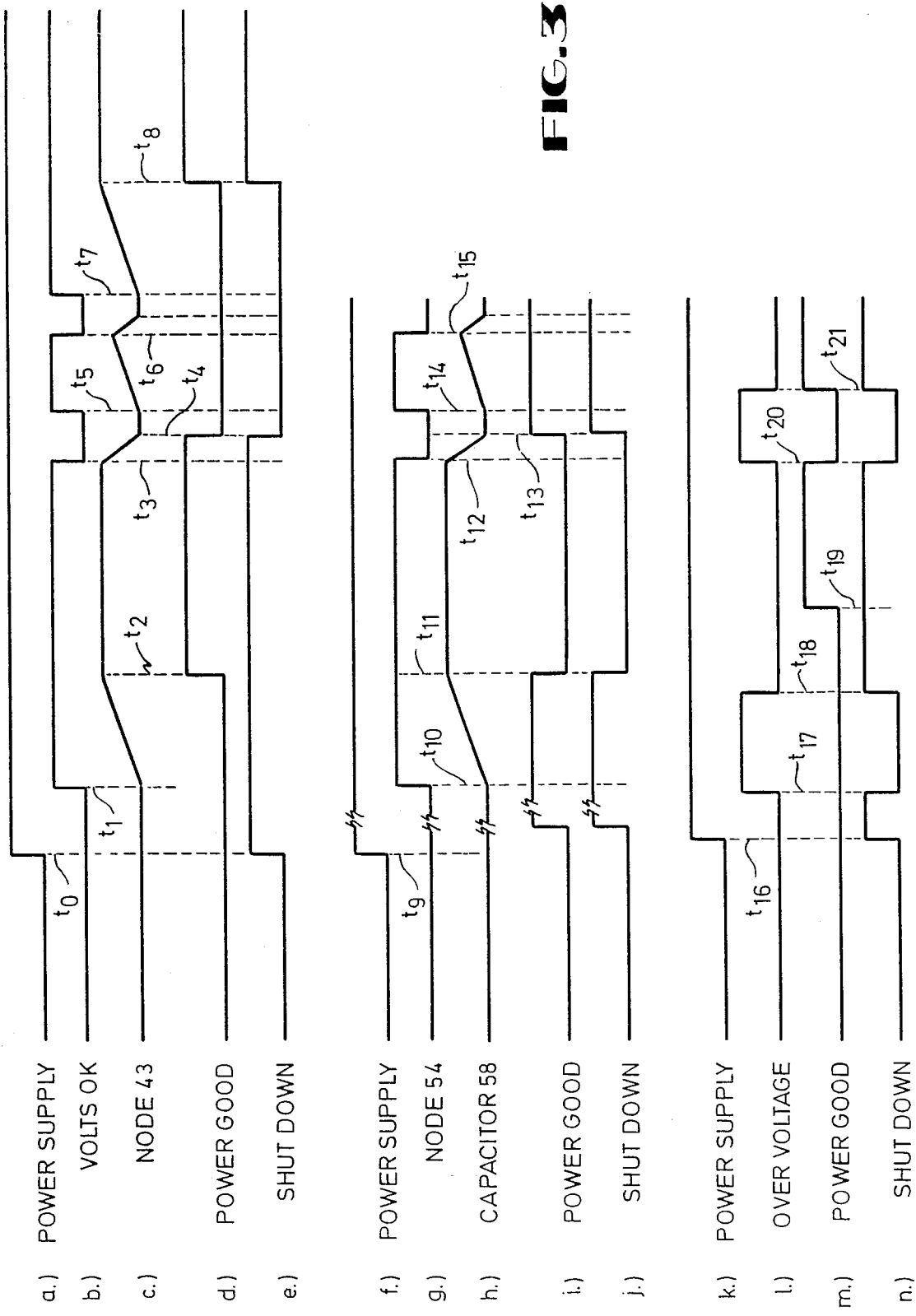
FIG. 3 is a timing diagram of voltage or events vs. time for various voltages in the power supply monitor of FIGS. 1 and 2.

Referring to FIGS. 3a–3n, timing diagrams are shown for the various voltages relating to the monitor circuit 15. Assume that the output voltages from the power supply 13 go high at $t_0$ of FIG. 3a, then the volts-OK node 26 will go high at time $t_1$ of FIG. 3b after the voltage comparators 16–20 have operated. The voltage on node 43 will reach a threshold level at time $t_2$ of FIG. 3c, after the capacitor 41 has charged, producing an output on node 46 and allowing the power-good signal to go high as seen in FIG. 3d, at which time the CPU 10 can be reset so the power-on initialization routine can begin. The shutdown signal is high (inactive) from time $t_0$ as seen in FIG. 3e, since there are no overvoltage or overcurrent conditions, and the undervoltage influence on the shutdown signal has not reached its timeout. The time $t_0$ to $t_2$ thus represents the power-on period, and $t_2$ to $t_3$ represents normal operation. At time $t_3$ an undervoltage condition is detected and the volts-OK signal goes low, allowing the node 43 to discharge by $t_4$ to a level which turns off the power-good signal and the shutdown signal drops at the same time. If the volts-OK signal of FIG. 3b then goes high for a short interval $t_5$ to $t_6$, the capacitor 41 does not have time to charge to the threshold level and the power-good and shutdown signals do not go back to their normal levels. However, if the volts-OK signal goes high at $t_7$ and stays high until $t_8$ the power-good and shutdown signal return to the proper level (both high).

In FIGS. 3f–3j, the operation of the overcurrent monitor is illustrated. Assume the system is operating with all conditions normal during the time $t_9$ to $t_{10}$, and at $t_{10}$ the output 54 of the current sensor indicates overcurrent. The capacitor 58 begins to charge at time $t_{10}$ and reaches the threshold level at time $t_{11}$ of FIG. 3h, at which time the power-good and shutdown signals drop to their fault level as seen in FIGS. 3a and 3j. If the overcurrent condition goes away at time $t_{12}$, the power-good and shutdown signals return to normal at time $t_{13}$. An overcurrent condition lasting a period of time $t_{14}$ to $t_{15}$ is not long enough to allow the capacitor 58 to charge to the trip level, so the power-good and shutdown signals will not change.

In FIGS. 3k–3n the operation of the response of the circuit to overvoltage is illustrated. If the power supply goes on a time $t_{16}$ of FIGS. 3k, then an overvoltage condition occurs during power-on at time $t_{17}$ of FIG. 3l, i.e., before the power-good signal goes high, then the shutdown signal immediately drops to the fault indication as seen in FIG. 3n. If the overvoltage condition disappears at time $t_{18}$, then the shutdown signal returns to normal immediately but the power-good signal continues the power-on timeout and goest high at time $t_{19}$. Then, during normal operation, if the overvoltage condition occurs at time $t_{20}$, both power-good and shutdown drop to the fault level immediagely, then return to normal immediately at time $t_{21}$ if the overvoltage condition disappears.

Figure 4:
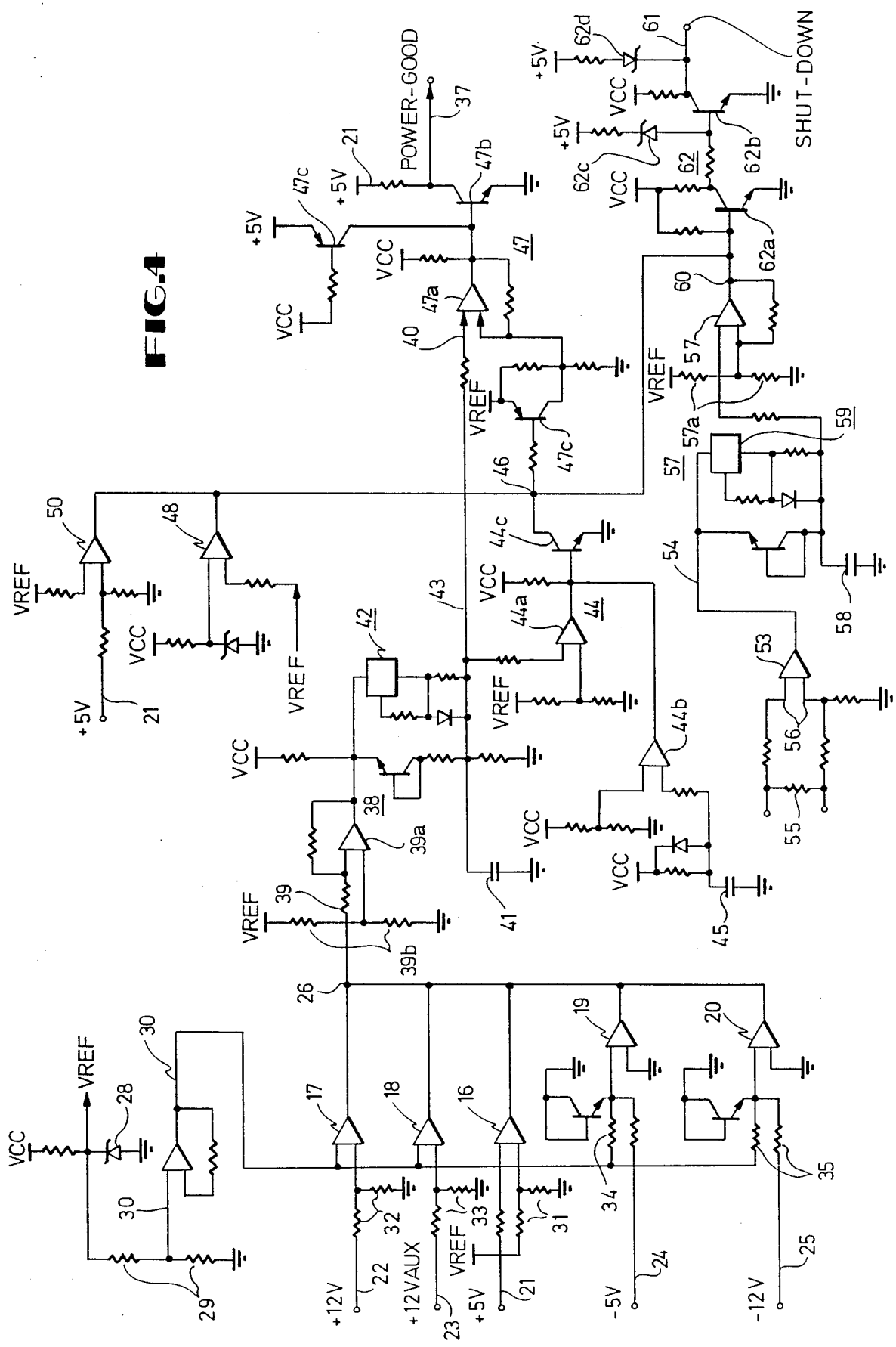
FIG. 4 is an electrical schematic diagram of the circuitry 15 of FIG. 2.

Referring to FIG. 4, the power supply supervisor circuit of FIG. 2 is shown in more detail in schematic diagram form. The five undervoltage comparators 16–20 are operational amplifiers having differential inputs, one of which in each case is from one of the voltage supply lines 21–25 and the other from the corresponding scaler circuit 31–35. The reference voltage $V_{ref}$ generator 28 includes a bandgap reference diode connected $V_{cc}$ through a resistor. The undervoltage set point on line 30 is isolated from the resistors 29 of the voltage divider by an operational amplifier. The delay circuit 38 includes an op-amp 38a which detects when the voltage on input 39 form node 26 exceeds a voltage set by a divider 39b across $V_{ref}$. The output 38a is applied to a current source 42 which charges the capacitor 41 when the output 38a switches, so the node 43 exhibits the waveform of FIG. 3c. This node is one differential input 40 to an op-amp 47a in the power-good driver circuit 47. The power-good output 37 is held down by an NPN transistor 47b having its base connected to $V_{cc}$ through a resistor, until the output of the op-amp 47a switches. The voltage on the node 43 is also a differential input to an op-amp 44a of the power-up delay circuit 44; the other input to this op-amp 44a is fixed voltage derived from $V_{ref}$. Another op-amp 44b produces an output that switches a selected time after $V_{cc}$ goes high, at power-up, with the delay selected by the capacitor 45. Both of these op-amps 44a and 44b drive the base of an NPN transistor 44c, and the op-amp 44b prevents this transistor from switching until a selected time after power-up, but thereafter an undervoltage condition causing a drop in the voltage at node 43 can cause the transistor 44c to produce a fault indication of the power-good and shutdown signals. The transistor 44c drives the node 46, which also provides a second input to the op-amp 47a via PNP transistor 47c. Other inputs to the node 46 include the overvoltage detectors 48 and 50, which are op-amps with differential inputs comparing the +5 V and $V_{ref}$ voltages to fixed references, so when either of these exceed the trip points the node 46 is driven to a fault condition and the power-good signal is driven low immediately via transistor 47c, op-amp 47a and transistor 47b. The other input to the node 46 is the overcurrent detector which monitors the voltage across the series resistor 55 by the differential input 56 of the op-amp 53, producing an output 54 delayed by charging the capacitor 58 through the constant current supply 59. When the voltage across the capacitor 58 reaches a trip level set by divider 57a, an op-amp 57b switches its output 60, and this output 60 is connected to the node 46 as well as to the base of NPN transistor 62a of the shutdown driver 62. The output transistor 62b holds the shutdown signal low unless the transistor 62a is turned on by the node 46 going high. In case the $V_{cc}$ voltage is lost by some failure in the power supply circuitry, the shutdown voltage is forced low to the fault level by current through a Zener diode 62c connected to the +5 V supply, which will turn on the transistor 62b; since the collector of the transistor 62b may be open, a current is provided to the collector by a diode and a resistor connected to the +5 V supply so there can be enough collector current to torce the shutdown output 61 low. Likewise, in case of a $V_{cc}$ failure, the power-good output 37 is forced low by a PNP transistor 47c which is ordinarily held off by $V_{cc}$ but which conducts to turn on the transistor 47b if $V_{cc}$ goes low.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of operating a computer comprising the steps of:
   (a) generating in a power supply at least one supply voltage for use in said computer;
   (b) monitoring said supply voltage and producing a first signal if said supply voltage is below a selected value;
   (c) detecting an overvoltage condition of said supply voltage;
   (d) detecting an overcurrent condition which persists for longer than a selected time for said supply voltage;
   (e) shutting off said power supply if either said overvoltage condition or said overcurrent condition is detected; and
   (f) preventing said computer from being reset until said first signal has not been present for a selected time.

2. A method according to claim 1 wherein said power supply generates a plurality of supply voltages use in said computer.

3. A method according to claim 2 including the step of shutting off said power supply if said first signal is present after a selected time from applying power to said power supply.

4. A method according to claim 1 wherein said step of monitoring includes monitoring a plurality of supply voltages produced by said power supply.

5. A method according to claim 1 including the step of generating a separate voltage for use as a voltage supply in said steps of monitoring and detecting.

6. A computer having a power supply monitor, comprising:
   (a) a power supply generating at least one supply voltage for use in said computer;
   (b) means for monitoring said supply voltage and producing a first signal if said supply voltage is below a selected value;
   (c) means for detecting an overvoltage condition of said supply voltage;
   (d) means for detecting an overcurrent condition which persists for longer than a selected time for said supply voltage;
   (e) means for shutting off said power supply if either said overvoltage condition or said overcurrent condition is detected;
   (f) said computer having a reset input responsive to said first signal to inhibit the computer from reset until said first signal has not been present for a selected time.

7. A device according to claim 6 wherein said power supply generates a plurality of supply voltages use in said computer.

8. A device according to claim 7 including means for shutting off said power supply if said first signal is present after a selected time from applying power to said power supply.

9. A device according to claim 8 wherein said means for monitoring monitors all of said supply voltages.

10. A circuit for monitoring a power supply for a computer or the like, the power supply producing a plurality of supply voltages, comprising:
    (a) a plurality of undervoltage detectors, each one of said undervoltage detectors being responsive to a separate one of said plurality of supply voltages and producing an output indicating whether one of said supply voltages is above or below a selected reference level;
    (b) means responsive to all of said outputs from all of said plurality of undervoltage detectors to produce a first signal when all of said supply voltages are above the selected reference level;
    (c) at least one overvoltage detector responsive to one of said plurality of supply voltages and producing an overvoltage indication if said one of the supply voltages exceeds a selected value;
    (d) a current detector responsive to current flow in a conductor for one of said supply voltages and producing an overcurrent indication if excess current flow is detected;
    (e) and means for negating said first signal and for generating a second signal upon occurrence of said overvoltage indication or said overcurrent indication.

11. A circuit according to claim 10 wherein said undervoltage detectors and said overvoltage detector compare said supply voltages to references voltage generated from a voltage supply separate from said supply voltages.

12. A circuit according to claim 10 wherein said supply voltages include both positive voltages and negative voltages.

13. A circuit according to claim 10 wherein said overcurrent indication is produced only if excess current is detected for longer than a selected time period.

14. A circuit according to claim 10 wherein said first signal is produced only if said undervoltage detectors produce said output for longer than a selected time period.

15. A method of monitoring a power supply for a computer or the like, the power supply producing a plurality of supply voltages, comprising the steps of:
(a) detecting undervoltage for each one of said plurality of supply voltages and producing a first signal indicating whether or not all of said supply voltages are above selected reference levels;
(b) detecting overvoltage for at least one of said supply voltages,
(c) detecting overcurrent for at least one of said supply voltages,
(d) producing a second signal when said overvoltage or said overcurrent is detected or when said first signal indicates undervoltage occurring after a selected time folowing power-up, and
(e) shutting down said power supply to prevent said computer from operating in response to said second signal.

16. A method according to claim 15 wherein said steps of detecting undervoltage and overvoltage include comparing said supply voltages to reference voltages generated from a voltage supply separate from said supply voltages.

17. A method according to claim 15 including the step of resetting said computer only in response to the level of said first signal.

18. A method according to claim 15 including the step of shutting down said power supply in response to said second signal.

19. A method according to claim 15 wherein said step of detecting overcurrent includes delaying an output indicating overcurrent for a selected time period.

20. A method according to claim 15 including the step of generating a delayed signal in producing said first signal.

* * * * *